UNITED STATES PATENT OFFICE 2,552,606

DERIVATIVE OF PATULINE AND PROCESSES OF PRODUCING SAME

Marc Vermeulen and Jules H. T. Le Drut, Brussels, Belgium, assignors to Luxema, S. A., Brussels, Belgium, a company of the Grand Duchy of Luxemburg No Drawing. Application March 1, 1950, Serial No. 147,145. In the Netherlands March 9, 1949

4 Claims. (Cl. 260—344)

This invention relates to a derivative of anhydro-3-hydroxymethylene-tetrahydro-1,4-pyrone-2-carboxylic acid and processes of producing that composition.

Anhydro-3-hydroxymethylenetetrahydro-1,4-pyrone-2-carboxylic acid, sometimes called patuline, has the formula:

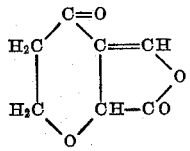

It has been isolated, utilizing as starting materials various stocks of fungi, such as Penicillium patulium, Penicillium expansum and Penicillium claviforme, and has been described by certain workers (Philip A. Kotzman et al., J. Biol. Chem., 154, 1944, pp. 475 to 486; Wiesner, Nature, 149, 357, 1942).

English workers (Lancet, 1944, II, pp. 370 to 372) have observed that patuline possesses a bacteriostatic action, i. e., it exhibits an action inhibiting growth, upon Gram-positive bacilli and Gram-negative bacilli. Tests conducted on the pyocyanic bacillus and on the Staphylococcus have not disclosed any growth-inhibiting effect of patuline.

The applicants have discovered that patuline presents a bacteriostatic action as against Koch bacilli. However, it has not been possible to consider the use of patuline for therapeutic purposes because of the toxicity of this product.

In accordance with this invention, a new derivative of patuline is provided that does not manifest the toxicity of patuline and yet possesses the characteristic property of acting not as a bacteriostatic agent but rather as a bacteriolithic agent as against Koch bacilli.

This new derivative of patuline, which is thiosemicarbazone of anhydro-3-hydroxymethylenetetrahydro-1,4-pyrone-2-carboxylic acid, which may be called the thiosemicarbazone of patuline, has been tested by the applicants in vitro and in vivo and gives favorable results in the treatment of various forms of tuberculosis, such as intestinal, biliary and renal tuberculoses, tuberculosis of the oesophagus, pulmonary tuberculosis, lupus, etc.

Because of the great solubility of thiosemicarbazone of patuline in lipoids, this substance very easily resorbs via the lymphatic passages. Favorable results are therefore achieved in the treatment of pulmonary tuberculosis.

In accordance with this invention, thiosemicarbazone of patuline is produced by dissolving patuline in an organic solvent miscible with water, after which the thiosemicarbazide is dissolved in distilled water and the two solutions are mixed while keeping the temperature below 10° C. According to an additional feature of the invention, patuline is dissolved in ethyl alcohol.

The thiosemicarbazone of patuline is produced in accordance with the following equation:

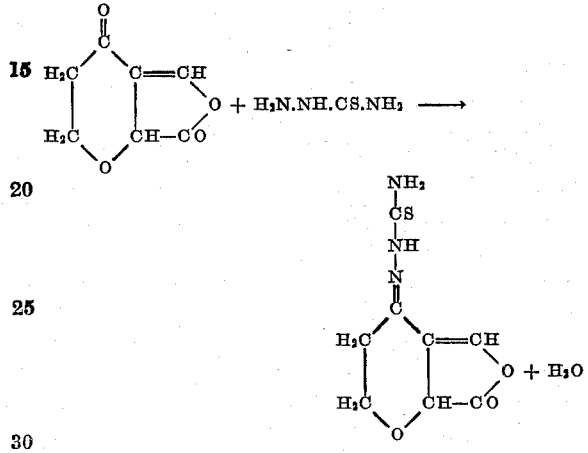

A more comprehensive understanding of this invention is obtained by reference to the following example:

Patuline melting at 109° C. is dissolved in ethyl aclohol having a density of 98° Baumé. Thereupon a saturated solution of thiosemicarbazide is prepared separately in distilled water. The two solutions are cooled with ice, and they are thoroughly mixed by stirring and by cooling by means of ice to absorb the heat generated by the exothermic reaction of condensation between the patuline and the thiosemicarbazide. The cooling by means of ice should preferably be such that the reaction mixture is maintained at a temperature below 10° C.

The yield of the thiosemicarbazone of anhydro-3-hydroxymethylenetetrahydro-1,4-pyrone-2-carboxylic acid is about 60% of the theoretical.

The thiosemicarbazone of patuline obtained is in the form of a crystalline substance of pale yellow color.

Instead of ethyl alcohol, other solvents for patuline, such as chloroform or benzene, have been found satisfactory in the practice of the preparation of the thiosemicarbazone of anhydro-3- hydroxymethylenetetrahydro-1, 4-pyrone-2-carboxylic acid in accordance with this method. The efficiencies of the reaction, however, fall below the efficiency obtained when ethyl alcohol is used.

It is obvious that the invention is not limited to the mode of operation described by way of example and that various modifications may be made in it without departing from the scope of the appended claims.

What is claimed is:

1. Thiosemicarbazone of anhydro-3-hydroxymethylenetetrahydro-1, 4 - pyrone - 2 - carboxylic acid.

2. The process of producing thiosemicarbazone of anhydro-3-hydroxymethylenetetrahydro-1, 4-pyrone-2-carboxylic acid which comprises reacting anhydro-3-hydroxymethylenetetrahydro-1, 4-pyrone-2-carboxylic acid with thiosemicarbazide.

3. The process of producing thiosemicarbazone of anhydro-3-hydroxymethylenetetrahydro-1, 4-pyrone-2-carboxylic acid which comprises reacting equimolecular proportions of anhydro-3-hydroxymethylenetetrahydro-1, 4-pyrone-2-carboxylic acid with thiosemicarbazide, said anhydro-3-hydroxymethylenetetrahydro-1, 4 - pyrone - 2 - carboxylic acid and said thiosemicarbazide being dissolved in solvents which are miscible with each other, while maintaining the reaction mixture during reaction at a temperature below 10° C.

4. The process of producing thiosemicarbazone of anhydro-3-hydroxymethylenetetrahydro-1, 4-pyrone-2-carboxylic acid in accordance with claim 3, in which anhydro-3-hydroxymethylenetetrahydro-1, 4-pyrone-2-carboxylic acid is dissolved in ethyl alcohol and the thiosemicarbazide is dissolved in water.

MARC VERMEULEN.
JULES H. T. LE DRUT.

No references cited.